Sept. 25, 1962

H. E. BACHER ETAL 3,055,682

ADJUSTMENT FITTING FOR REINFORCED HOSE IN WHICH
A SEAL IS MAINTAINED DURING ADJUSTMENT

Original Filed Oct. 11, 1955

INVENTORS
Hans E. Bacher
Roger P. LaMarre
BY Beaman & Beaman
ATTORNEY

United States Patent Office 3,055,682
Patented Sept. 25, 1962

3,055,682
ADJUSTMENT FITTING FOR REINFORCED HOSE IN WHICH A SEAL IS MAINTAINED DURING ADJUSTMENT
Hans E. Bacher, Stuttgart Degerloch, Germany, and Roger R. La Marre, Jackson, Mich., assignors to Aeroquip Corporation, Jackson, Mich., a corporation of Michigan
Original application Oct. 11, 1955, Ser. No. 539,831, now Patent No. 2,833,567, dated May 6, 1958. Divided and this application Apr. 28, 1958, Ser. No. 731,527
3 Claims. (Cl. 285—149)

The present application is a division of application Serial No. 539,831, filed October 11, 1955, and relates to improvements in end fittings for hose having a lip seal which is so designed that the nipple may be readily rotated after assembly thus providing an end fitting which is especially adapted for an elbow connection.

As disclosed, the invention comprises a nipple inserted into the hose having an elbow extension, a swiveled adaptor on the nipple, a sleeve to be inserted between the inner tube of the hose and the hose reinforcement, a socket having axial movement relative to the adaptor for gripping the reinforcement between the sleeve and the socket, and a metal-to-metal seal between the sleeve and the nipple. To adjust the angularity of the elbow a slight rotation of the socket to relieve the pressure of the metal-to-metal seal will enable the nipple and elbow to be readily rotated relative to the sleeve and socket. The ease with which the nipple may be rotated results from the fact that the compressive forces of initial assembly are of small magnitude.

Thus an object of the invention is to provide an improved end fitting for flexible hose characterized by the ease with which the nipple may be relieved of assembly forces and rotated relative to the associated components of the assembly.

Another object is to provide an improved end fitting having a sealing lip, a metal-to-metal seal and a nipple having an elbow connection.

These and other objects and advantages will appear from the following description and claims.

Figure 1:
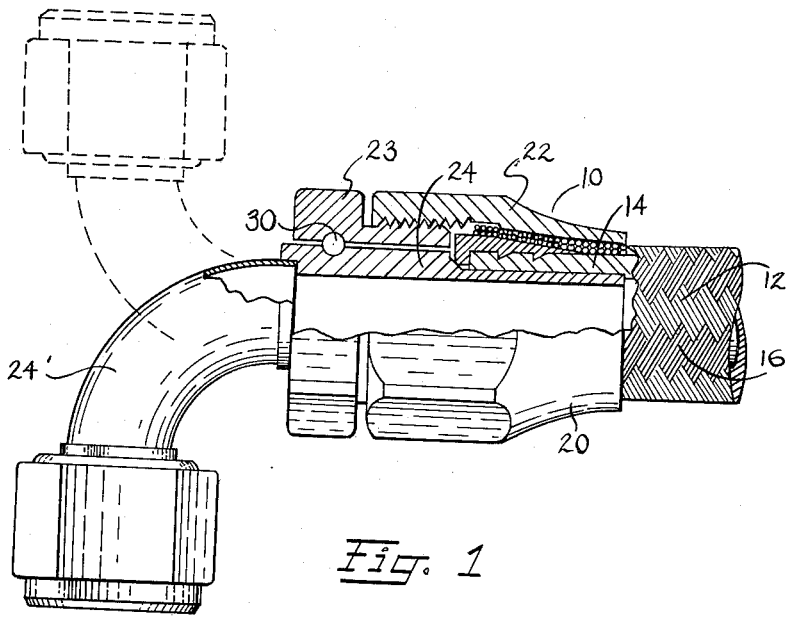
FIG. 1 is a side elevational view partly shown in broken section.

Referring to the illustrated form of the invention, the hose line assembly 10 comprises a flexible hose 12 having an inner tube 14 and a reinforcing structure for the tube in the form of braided wire 16. The end fitting 18 is of a detachable, reuseable type and comprises a socket 20 for threaded engagement at 22 with a swivel adaptor 23. The nipple 24 is rotatable in the adaptor 23. A sealing sleeve 26 is shown embracing the terminal end of the inner tube 14 herein called the lip seal portion 28. A wire 30 attaches the nipple 24 to the adaptor 23.

While it is to be understood that the invention has general application to flexible hose construction materials heretofore in wide use, it is especially adapted to the effective sealing of hose construction having an inner tube of relatively stiff and low elastic material, as for example, such materials as polymerized tetrafluoroethylene.

The hose 12 in the assembly illustrated is first cut to length and is then inserted into the socket 20, the latter being slid inwardly from the cut end of the hose. Next the nipple 24 is inserted into the portion of the inner tube 14 to loosen the wire braid 16 adjacent the end of the hose 12 to facilitate the insertion of the sleeve 26. After loosening the wire braid 16 the nipple 24 is withdrawn from the bore of the inner tube 14 and the sleeve 26 is manually inserted between the wire braid 16 and the inner tube 14 to assume the position shown in FIG. 2. Thereafter the nipple 24 with the sleeve 26 embracing the end 28 is reinserted into the bore of the tube 14 and the socket 20 is slid along the hose 12 until threaded engagement can take place at 22 between the socket 20 and adaptor 23 upon relative rotation.

After the adaptor 23 is screwed into the socket 20, the forces developed by this assembly bring the rounded external annular shoulder 34 of the sleeve 26 into fluid sealing contact with the conical surface 36 of the nipple 24. At the same time, the wire braid 16 is wedged at 38 between the sleeve 26 and the socket 20 and firmly clamped. Compression of the hose 12 at 40 between the nipple 24 and the socket 20 will also take place upon assembly as just described for reasons hereinafter appearing.

Figure 2:
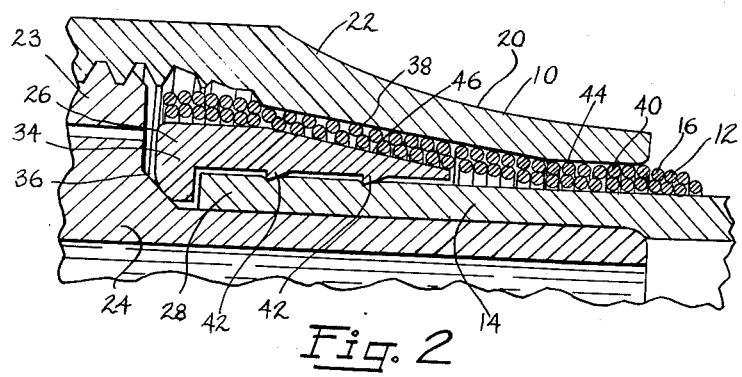
FIG. 2 is an enlarged vertical cross section view of a portion of the fitting shown in FIG. 1.

With the inner tube 14 of a material relatively stiff and non-elastic as compared to the usual elastomeric inner tube stock of flexible hose lines, insufficient pressure is developed to provide an initial seal between the inner tube end 28 and the sleeve 26 unless some provision is made to obtain the necessary contiguous association between the fluid pressure actuated lip seal portion 28 and the inner surface of the embracing sleeve 26. At the same time it is desirous that this contiguous relationship between the sealing surfaces be obtained without sacrificing the advantages connected with a detachable, reuseable type of fitting which may be manually assembled without the use of special assembly tools. To this end in connection with the example being described, the outside diameter of the inner tube 14 is approximately .281″, the inside diameter of the bore is approximately .187″ and the outside of the nipple 24 is approximately .207″. Thus the tube 14 will have its normal inside diameter of approximately .187″ expanded an amount approximately .020″ at the time the nipple 24 is manually inserted into the inner tube 14. The sleeve 26, where it embraces the terminal end 28 of the inner tube 14 has a main inside diameter of approximately .280″ with the inside diameter of the annular sharp cornered ribs 42 approximating .268″ which is in the order of .012″ less than the expanded outer diameter of the inner tube 20. With existing manufacturing tolerances, in practice the amount of squeeze or compression exerted by the ribs 42 upon the tube 20 will be in the order of .008″ to .013″. This amount of squeeze permits the sleeve 26 to be manually applied to the end of the inner tube 14 and thereafter the manual insertion of the nipple 24 into the bore of the hose 12 may take place with the sleeve 26 embracing the inner tube 14 as shown in FIG. 2 and with the ribs 42 deforming the inner tube 14 as indicated. The relationship of the ribs 42 with reference to the material of the lip seal portion 28 is such as to prevent any appreciable flow of fluid between the ribs 42 and the deformed body of the inner tube and to an extent which enables the fluid pressure within the inner tube 14 and between the inner tube 14 and the outer surface of the nipple 24 to build up the necessary pressure along the inner surface of the tube 14 to force the annular sealing lip portion 28 embraced by the sleeve 26 into sealing relation with the inside wall of the sleeve 26. Under conditions of vacuum the lip seal portion 28 will seal along the outer surface of the nipple 24. In practice the inside diameter of the socket 20 at 44 will approximate the outside diameter of the wire braid 16 to produce at 44 a compression area to provide low pressure and vacuum sealing at this point.

To prevent deformation of the sleeve 26 during the final assembly of the socket 20 on the adaptor 23, the sleeve 26 has been provided with a long taper and the male taper of the sleeve 26 at 46 can be made greater than the female taper of the socket 20 at 48. This difference in taper also acts to force the shoulder 34 of the sleeve 26 into metal-to-metal sealing relation with the conical surface 36 of the nipple 24. Where the forces of assembly directed against the nipple 26 are sufficiently great to cause deformation of the conical surface 36 when the shoulder 34 of the sleeve 26 is rounded, it may become desirable to have the surface 34 more complementary to the surface 36 so as to distribute the loading of the metal-to-metal seal between the nipple 24 and the sleeve 26 over a greater area.

To appreciate the present invention it must be understood that the contiguous relationship between the lip seal portion 28 of the inner tube 14 and the inner surface of the sleeve 26 is that required only to provide an initial seal enabling the fluid pressure in the inner tube 14 and between the outer surface of the nipple 26 and the inner surface of the portion 28 to urge the portion 28 radially outward to actuate the outer wall of the portion 28 into fluid sealing relation with the inner wall of the sleeve 26 and to provide relatively high unit compression at the areas of the ribs 42 without sacrificing manual assembly. Two ribs 42 are shown because we feel that it is a preferred arrangement. However, a single rib 42 is capable of giving satisfactory performance depending upon the characteristics of the inner tube material.

It should also be understood in order to distinguish the present invention over that of Patent No. 2,463,293 that the amount of compression to which the lip seal portion 28 is subjected as a result of the initial assembly of the inner tube 14 with the sleeve 26 and nipple 24 is of a minor magnitude as compared to the compression developed in the final assembly of socket 20 upon the adaptor 23 and to which the wire braid 16 is subjected. The sleeve 26 is constructed to protect the lip seal portion 28 from the high compression forces of final assembly in distinction to the disclosure of said patent. It is because of this fact that the nipple 26, upon loosening of the threaded connection between the adaptor 23 and socket 20, may be readily rotated within the bore of the inner tube 14. After the initial assembly, the forces of assembly required to bring at least an annular portion of the lip seal portion 28 into contiguous relationship with at least an annular portion of the sleeve 26, need not be sustaining compressive forces. It is for this reason that the present invention makes it possible for the first time to provide an end fitting having optimum performance capacity with hose having an inner tube of deformable material of the class of elastomers and plastomers which are incapable of sustaining forces of compression of fluid sealing magnitude under pressures for which the assembly is designed under conditions of use and aging experienced in actual service.

To adjust the angularity of the elbow extension 24' brazed to the nipple 24 it is only necessary to effect slight relative rotation between the socket 20 and the adaptor 23 to relieve the pressure of the metal-to-metal seal between the shoulder 34 and the conical surface 36. Thereafter the nipple 24 and elbow 24' may be readily rotated by hand to locate the position of the elbow 24' as desired. This ability to so manipulate the nipple 24 and elbow 24' results from the fact that the compressive forces upon the nipple 24 resulting from initial assembly are of small magnitude and that sealing of the inner tube 14 within the fitting is dependent upon actuation of the lip seal 28 portion by fluid pressure.

Having thus described our invention, what we claim as new and patentable is:

1. In combination, a hose having an inner fluid sealing tube and an outer tubular reinforcement, an elbow and end fitting assembly of the lip seal type for said hose characterized by being detachable and reuseable and its ease of angular adjustment comprising a nipple provided with a shoulder portion having an elbow extension non-rotatably connected thereto, said nipple having a reduced substantially cylindrical portion of generally uniform diameter extending from said shoulder portion in a direction opposite to said elbow, frusto conical means joining said shoulder portion and said cylindrical portion of said nipple extending radially and diagonally outwards from said reduced substantially cylindrical portion thereby forming an abutting surface, a sleeve having a radially inwardly extending portion directly abutting said frusto conical means to provide a non-deformable wall defining with said nipple end annular recess to receive the lip seal portion of the fluid sealing tube of the hose, a socket embracing said sleeve and nipple and defining with said sleeve an annular recess to receive the reinforcement of the hose, an adapter in which said nipple is supported for swivel movement relative to said sleeve and socket, a threaded connection between said adapter and said socket to effect relative axial movement between said sleeve and nipple to grip the hose reinforcement between said socket and said sleeve and to exert an axial thrust on said sleeve, an axial thrust connection between said adapter and said nipple to resist relative axial movement between said nipple and adapter while permitting relative swivel movement, said directly abutting portions on said nipple and sleeve providing a metal-to-metal seal regulated by the thrust upon said sleeve by said socket whereby said nipple and the angularity of said nipple and elbow extension may be readily adjusted without distorting said lip seal upon relieving the thrust upon said sleeve.

2. In the combination of claim 1, said sleeve and said socket having opposed conical surface between which the reinforcement is gripped.

3. In the combination of claim 1 wherein said inner sealing tube is relatively free from compressive forces within the annular recess between said nipple and sleeve.

References Cited in the file of this patent

UNITED STATES PATENTS

| | | |
|---|---|---|
| 656,187 | Gunnell | Aug. 21, 1900 |
| 2,120,275 | Cowles | June 14, 1938 |
| 2,310,250 | Melsom | Feb. 9, 1943 |
| 2,685,458 | Shaw | Aug. 3, 1954 |
| 2,749,151 | Lyons | June 5, 1956 |
| 2,833,567 | Bacher et al. | May 6, 1958 |